June 29, 1937.  R. OPPENHEIM  2,085,598
ELECTRIC CELLS CONNECTED IN A BATTERY
Filed June 14, 1933
.Fig.1.
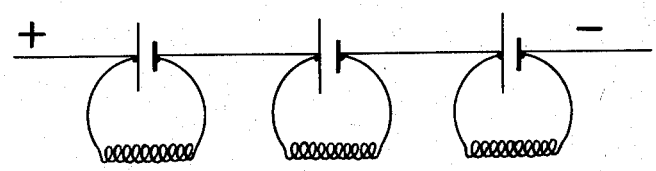
.Fig.2.
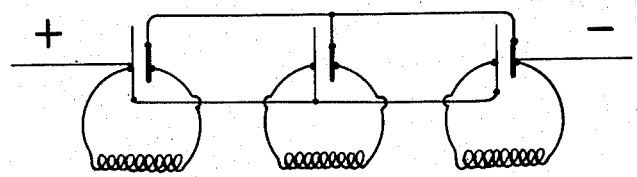
RENÉ OPPENHEIM
INVENTOR
BY Haseltine, Lake & Co.
ATTORNEYS Patented June 29, 1937

2,085,598

UNITED STATES PATENT OFFICE 2,085,598

ELECTRIC CELLS CONNECTED IN A BATTERY

René Oppenheim, Gennevilliers, France, assignor to Societe Anonyme Le Carbone, Gennevilliers, France Application June 14, 1933, Serial No. 675,677
In France July 2, 1932

5 Claims. (Cl. 136—109)

It is known that when primary electric cells are connected in a battery, that is to say when several elements are connected either in series, or in parallel, the differences of internal resistance of the elements determine differences of voltage which are sometimes relatively important in cells connected in series, and differences of output which may be considerable in cells connected in parallel.

These differences of voltage or output can, in certain cases, entail inconveniences which may even cause the batteries to be prematurely put out of use owing to the wear, also premature exhaustion of some of the elements.

It may even happen that, in a series of several elements, one of them presents the phenomenon of a reversal of polarity before exhaustion of its normal capacity.

The present invention is adapted to remedy these inconveniences and substantially consists in so arranging each primary cell that it supplies a very weak current independent of the main current supplied by the battery, this tending to render the voltage at the terminals approximately the same in all the cells.

Fig. 1 diagrammatically illustrates a battery of cells embodying the present invention, the cells being connected in series.

Fig. 2 shows a similar battery of cells connected in parallel. Each of the cells in both Figs. 1 and 2 is provided with a resistance connected to the elements therein in a manner and for a purpose which will appear more clearly hereinafter.

According to the invention, this result is obtained by connecting to the terminals of each primary cell a resistance of such high ohmic value that the current passing in this resistance is sufficient for obtaining the desired equality of voltage, whilst being sufficiently weak so that it should not constitute a loss liable to appreciably compromise the life of the cell.

In order that the invention may be clearly understood, it will be assumed that to a primary cell having a capacity of 500 ampere-hours, is connected a resistance of about 1000 ohms.

It will thus be seen that the leakage current is of about 1.5 milliamperes, and amounts, after two years time, only to about 25 ampere-hours, that is to say 5% of the nominal capacity of the cell.

This resistance may be of any suitable nature; for it may consist either of a resistance wire or be made of silicon carbide, or any suitable resistant material. It can be permanently connected to both terminals of the cell and, if desired, partially or completely embedded in the wax closing the upper part of the cell.

One of the ends of the resistance can also be permanently connected to one of the terminals of the cell, and the other end can be provided with any tapping which is connected to the other terminal of the cell, at the time of utilization.

Finally, another method consists in incorporating in the wax serving to close the primary cell and retain the electrolyte, a material which is a conductor of electricity, in such proportion that the ohmic resistance between the terminals of the cell is equal to the desired value such as it has been defined above. It is, of course, within the scope of the invention to apply the features thereof to any type of primary cell which provides an original source of current, no matter what type of elements are used or what type of electrolyte conducts the current from one element to the other in each cell. In every case, however, the elements of each cell form parts of an actually closed circuit through which a current continuously passes, the current passing within each cell from one element to the other through whatever electrolyte is present, which electrolyte attacks at least one of the elements to produce the current, while said current exteriorly passes through a high resistance conductor which allows a more or less uniform current to pass at all times continuously through each cell. The elements of the cells are thus interconnected by the electrolyte within and exteriorly by the high resistance conductor which governs the amount of current constantly flowing.

It is to be understood that all the details of construction for carrying out the invention can be modified according to circumstances, without departing from the principle of the same.

What I claim as my invention and desire to secure by Letters Patent is:

1. In a group of primary cells connected in series and, individually having pairs of primary elements, there being continuously conductive electrolyte means within each primary cell directly interconnecting the pair of elements within the same and chemically interacting with at least one of said elements to produce a primary electric current, independently of any exterior current supply, and said group of primary cells being connected into a battery forming an original source of current, means for equalizing the voltage of the various elements of said primary cells, comprising a conductive electric resistance of predetermined ohmic value connected to the terminals of the pair of elements of each primary cell exteriorly and independently of the electrolyte means thereof and both closing the circuit of each cell and causing the same to supply a very weak continuous current independently of the main current of the battery.

2. In a group of primary cells connected in series and, individually having pairs of primary elements, there being continuously conductive electrolyte means within each primary cell directly interconnecting the pair of elements within the same and chemically interacting with at least one of said elements to produce a primary electric current, independently of any exterior current supply, and said group of primary cells being connected into a battery forming an original source of current, means for equalizing the voltage of the various elements of said primary cells, comprising a conductive electric resistance connected to the terminals of the pair of elements of each primary cell exteriorly and independently of the electrolyte means thereof and both closing the circuit of each cell and having such a high predetermined ohmic value as to cause the current passing to produce the desired equalization of the voltage and also effectively prevent said passing current from forming an appreciable loss.

3. In a group of primary cells connected in series and, individually having pairs of primary elements, there being continuously conductive electrolyte means within each primary cell directly interconnecting the pair of elements within the same and chemically interacting with at least one of said elements to produce a primary electric current independently of any exterior current supply, and said group of primary cells being connected into a battery forming an original source of current, means for equalizing the voltage of the various elements of said primary cells, comprising a conductive electric resistance of predetermined ohmic value connected at one end to the terminal of one of the elements of each primary cell independently of the electrolyte means thereof and having its other end provided with a tapping by which it is connected to the terminal of the other element in each primary cell, said resistance in each case both closing the circuit of each cell and causing the same to supply a very weak continuous current independently of the main current of the battery.

4. Means according to claim 1, wherein the conductive electric resistance consists of a wire.

5. Means according to claim 1, wherein the conductive electric resistance consists of a silicon carbide wire.

RENÉ OPPENHEIM.